United States Patent [19]

Davies

[11] 4,428,671

[45] Jan. 31, 1984

[54] OPTICAL DEVICE FOR VERTICALLY POSITIONING A SEXTANT

[75] Inventor: Thomas D. Davies, Potomac, Md.

[73] Assignee: Davis Instruments Corporation, San Leandro, Calif.

[21] Appl. No.: 283,583

[22] Filed: Jul. 15, 1981

[51] Int. Cl.³ .............................................. G01C 1/10
[52] U.S. Cl. .................................... 356/144; 356/145; 33/282
[58] Field of Search ............... 356/140, 142, 143, 144, 356/148, 248, 399, 146; 33/282; 350/287, 484

[56] References Cited

U.S. PATENT DOCUMENTS

| | | |
|---|---|---|
| 714,276 | 8/1902 | Blish . |
| 1,098,212 | 8/1914 | Barr et al. .......................... 356/248 |
| 1,337,912 | 5/1920 | Hughes et al. . |
| 1,337,921 | 4/1920 | Lamb . |
| 1,699,827 | 7/1929 | Wright . |
| 1,743,979 | 6/1930 | Radford et al. . |
| 2,395,559 | 7/1946 | Link . |
| 3,074,315 | 9/1963 | Seibel et al. . |
| 3,431,552 | 3/1969 | Weeks et al. ........................ 350/287 |
| 3,580,687 | 6/1971 | Hansen . |
| 3,836,258 | 9/1974 | Courten et al. ..................... 356/399 |

FOREIGN PATENT DOCUMENTS 76893  6/1919  Austria ............................... 350/287

Primary Examiner—R. A. Rosenberger
Assistant Examiner—L. A. Dietert
Attorney, Agent, or Firm—Finnegan, Henderson, Farabow, Garrett & Dunner

[57] ABSTRACT

An optical device for vertically positioning a sextant to minimize the "tilt error" which occurs in a measured angle of altitude whenever the sextant is not held orthogonal to the horizon. The optical device can be fixed to the sextant and provides in the sextant's viewing area a secondary horizon which will align with the direct horizon only when the sextant is in a vertical orientation. The device is capable of periodic calibration and can be pivoted out of the line of sight when the sextant's user is initially locating the celestial body whose altitude is being measured.

14 Claims, 7 Drawing Figures

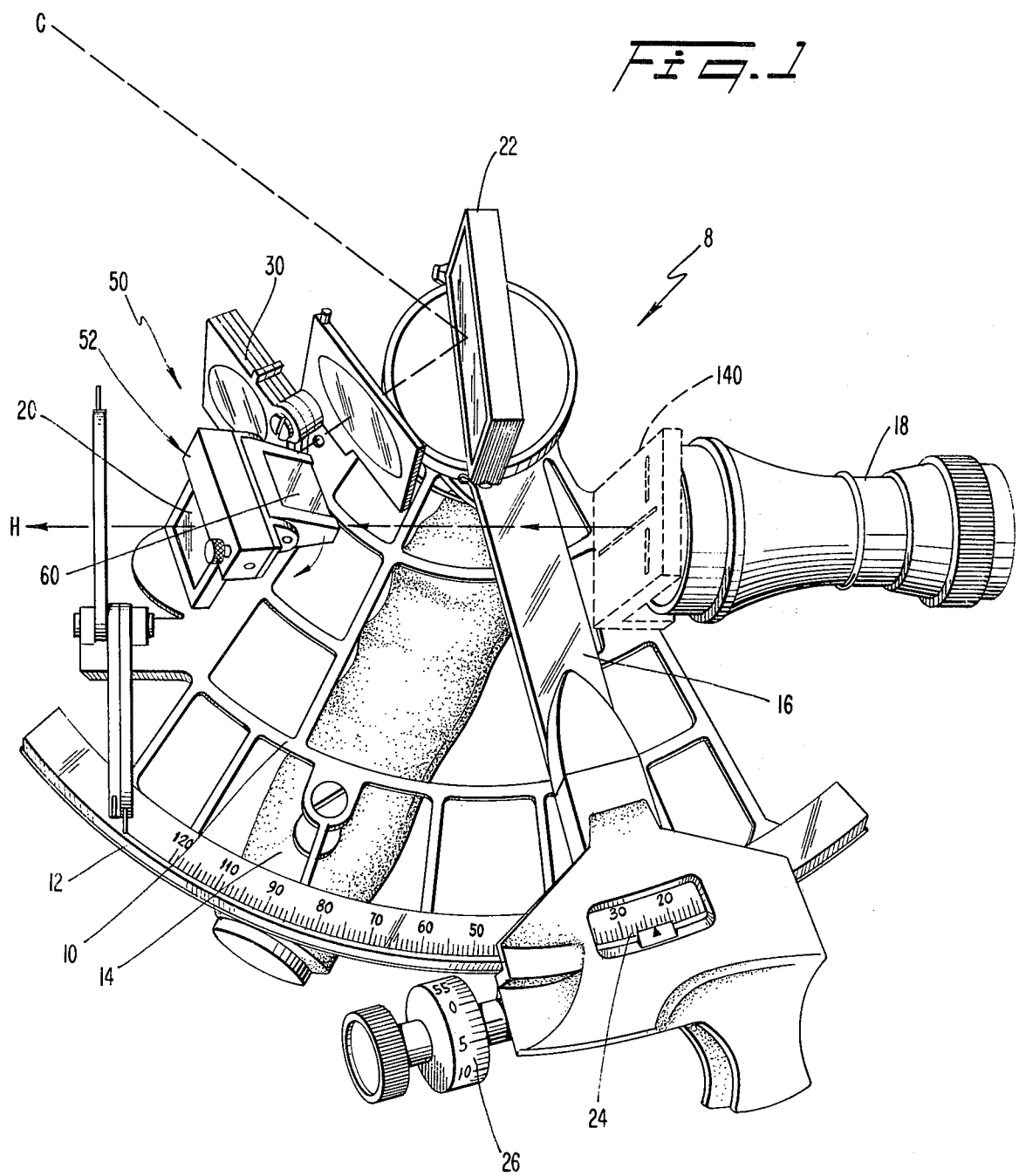

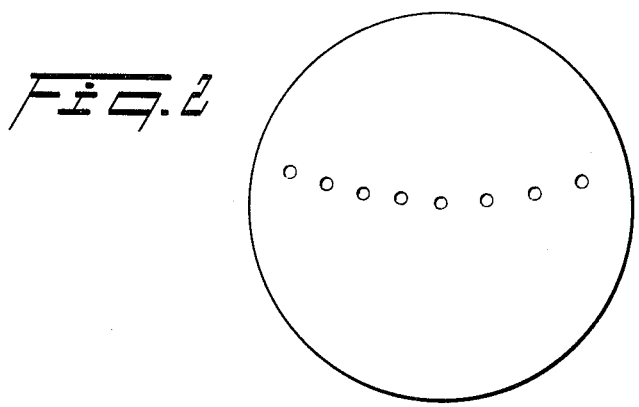
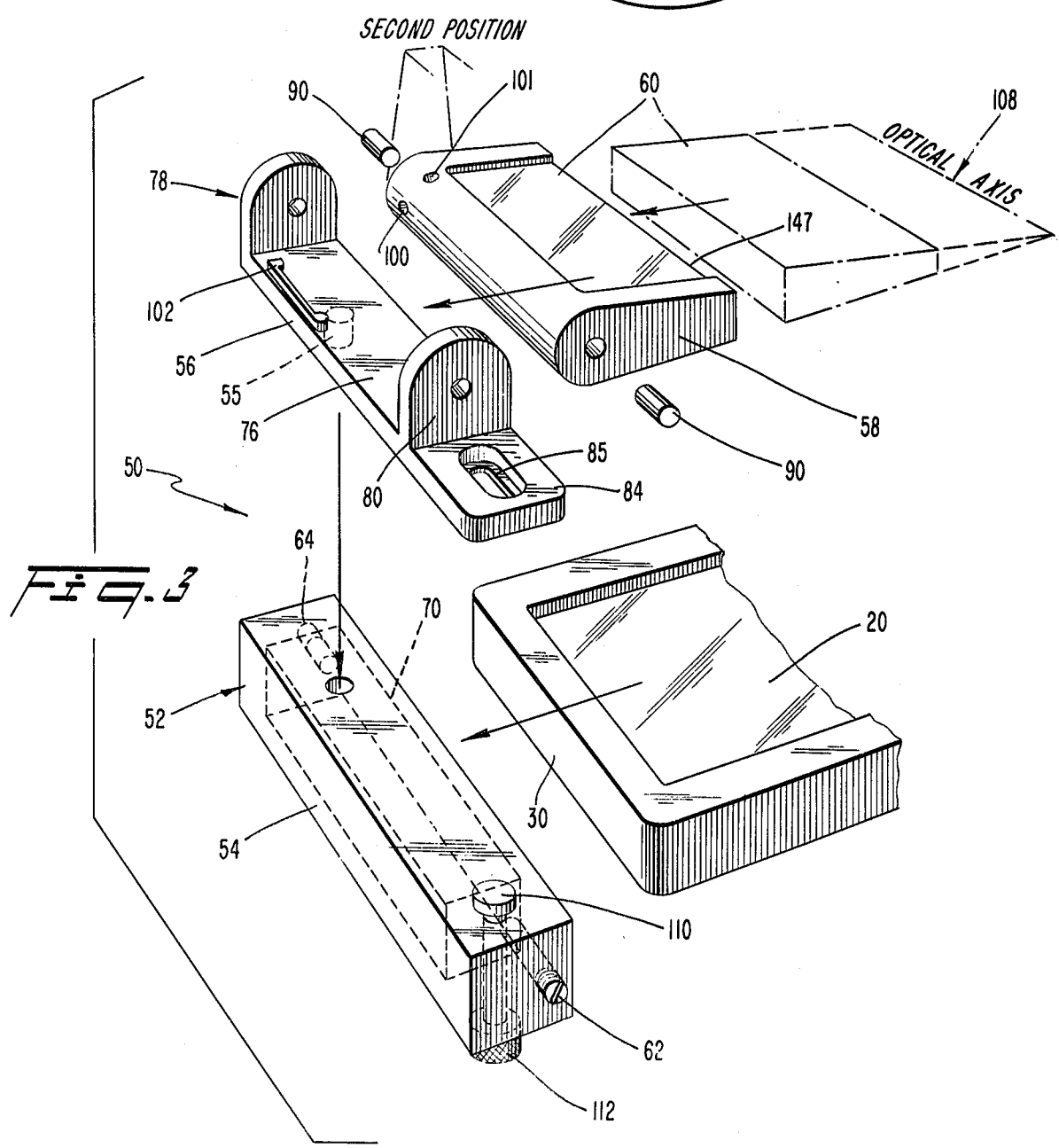

OPTICAL DEVICE FOR VERTICALLY POSITIONING A SEXTANT

BACKGROUND OF THE INVENTION

1. Field of the Invention

The present invention relates to an optical device for vertically positioning a sextant to minimize the "tilt error" which occurs in the measured angle of altitude whenever the sextant is not held orthogonal to the horizon. More particularly, the invention is directed to an optical device which provides in the sextant's viewing area a secondary horizon which will align with the direct horizon only when the sextant is in a vertical orientation. The optical device is positioned along the line of sight and preferably, but not necessarily between the sextant's horizon mirror and eyepiece, is capable of being calibrated, and can be pivoted out of the line of sight when the sextant's user is initially locating the celestial body whose altitude is to be measured.

2. Description of the Prior Art

It is well-known that a marine sextant is used for measuring the angular altitude of celestial bodies above the sea horizon. By accurately measuring the angular altitude of a given celestial body at a given time, a skilled navigator can determine a line of position. With two or more such lines, the navigator can calculate his position. It is important that the angle be measured as accurately as possible since an error of only one minute of arc will result in a position error of at least one nautical mile.

As will be described below, any misalignment in the elements of a sextant will lead to errors in the sextant's reading. It is therefore important that a sextant be properly calibrated each time it is used. Sextants typically provide a means for such calibration. Even if a sextant is perfectly calibrated, however, the sextant's reading will include a "tilt error" unless the sextant is perfectly orthogonal to the horizon. Since readings from a sextant normally are taken from a rolling ship, it is exceedingly difficult to align the sextant vertically. As will be explained below, applicant has invented an optical device designed to facilitate the vertical positioning of a sextant.

In order to understand and appreciate the present invention, it is necessary to briefly explain the use and operation of a sextant, the causes of errors in a sextant's reading, and present methods of correcting or attempting to correct those errors.

A typical sextant, referred to generally as 8, is shown in FIG. 1. The sextant includes a frame 10, a handle 14 fixed to frame 10, and an index arm 16 pivotably connected to frame 10. A telescope or eyepiece 18 is connected to frame 10 and is aligned with a horizon mirror 20 which is also fixed to the frame. The horizon mirror 20 is constructed so that light from the horizon may come directly through all or a portion of the mirror, enabling a navigator to view through the eyepiece 18 the horizon directly in front of him. The horizon mirror also is constructed so that all or a portion of the mirror will reflect light from its surface toward the eyepiece 18. The sextant also includes an index mirror 22 fixed to the index arm 16. The index mirror is reflective only, and in combination with the horizon mirror 20 will provide a navigator with a reflected view of a celestial body in the eyepiece 18. When the index mirror 22 and horizon mirror 20 are parallel to one another, the sextant should read 0° on the limb 12 at arc 24. The index mirror 22 is rotatable relative to the horizon mirror 20, and that rotation can be effected by micrometer dial 26.

When using a sextant, a navigator observes both the horizon H through the horizon mirror and a celestial body C whose image is double reflected, first from the index mirror 22 to the horizon mirror 20, and second from the horizon mirror 20 to the eyepiece 18. When the sextant is vertical and the rays of the horizon H and celestial body C are aligned, the angulation read from the arc 24 and the micrometer dial 26 is directly related to the altitude of the celestial body C. A more detailed explanation of the use of a sextant is described in these books: F. D. Wright, *Celestial Navigation*, (Cornell Maritime Press, 4th Printing 1980); N. Bowditch, *American Practical Navigator*, (GPO 1966).

For a sextant to give a proper reading, it is important that both the index mirror and the horizon mirror be perpendicular to the frame of the sextant. It is also important that the index mirror and horizon mirror be parallel to each other when the sextant is placed at the zero setting. in view of the importance of these relationships, most sextants include mechanical means for adjusting and calibrating the perpendicularity and parallelism of the index and horizon mirrors. A good navigator calibrates the placement of the index and horizon mirror before taking any readings, and the methods of accomplishing this calibration are well-known. For example, these steps are described in *American Practical Navigator*, pp. 412–415, supra.

A perfectly calibrated sextant will still give erroneous measurements unless the plane of the body of the sextant is precisely vertical when a reading is taken. If it is not, the measured angle of altitude will be greater than the actual angle of altitude, regardless of which direction the sextant is tilted. As is known in the art, the altitude of a celestial body is its vertical angle above the horizon. It is apparent that the angular distance from the celestial body to any point on the horizon other than the point vertically below the body is greater than its actual altitude. The difference in the actual and measured altitude is a "tilt error" which can lead to significant errors in a sextant reading. First, the degree of tilt cannot be measured on a rolling ship, and generally the sextant's user is not aware of the existence or nonexistence of tilt. Tilt error increases as the angle of tilt increases and is believed to increase with an increase in the altitude of the celestial body being observed, at least until that altitude reaches 45°. Some persons believe that the tilt error is maximum for a celestial body having an altitude of 45° and decreases with larger and smaller altitudes. It is generally agreed, however, that tilt error can lead to significant navigational errors. Furthermore, the tilt error will not self correct by taking the average of several readings since each tilt error, regardless of the direction of tilt, will result in an increased reading.

Although the problems associated with tilt error have been recognized for many years, the only currently applied method of attempting to vertically position a sextant is a complicated procedure called dipping or rocking. The process is illustrated in FIG. 2. Once a navigator simultaneously positions the image of the celestial body and the horizon in the sextant's viewing area, he must then orient the sextant in a vertical position and place the image of the celestial body on the observed horizon by manipulating the sextant's micrometer drum. According to the dipping procedure, the navigator must rock the sextant gently with his right hand until he sees the celestial body's image moving on an arc to the left and then to the right, as shown in FIG. 2. The object of the dipping process is to turn the micrometer drum so that the image of the celestial body is perfectly tangent to the horizon at the lowest point of its arc. If the navigator can accomplish that objective and immediately "mark" the time when he is successful, then at least theoretically the resultant reading is one taken when the sextant is vertical. This procedure is described in *American Practical Navigator*, supra, p. 402 and *Celestial Navigation*, supra, pp. 18–19.

It has been the inventor's experience that many neophyte navigators, and indeed some more seasoned navigators, are inept at the rather awkward procedure of dipping. It is therefore believed that tilt error is fairly prevalent and more consequential than is generally thought. The inventor has also concluded that the degree of tilt error depends upon how the sextant is rocked. Many navigators rock the sextant about a horizontal axis, and others rock the sextant about a line drawn from the sextant to the star. It is the inventor's conclusion that the tilt error is greater when the sextant is rocked about a horizontal axis. In either circumstance, however, the error is substantial. The inventor has calculated that tilting a sextant 5° out of vertical when measuring a star at a 45° altitude can result in a 13 mile error in the line of position, if the sextant is being rocked about a horizontal axis, and a 6.6 mile error, if the sextant is rocked about a line drawn from the sextant to the star. The author of an authoritative text on the subject of celestial navigation has similarly concluded that a 10° tilt out of vertical would cause a 26 minute (or 26 nautical mile) error for a celestial body having an altitude of 45°. *Celestial Navigation*, supra, p. 19. Since two or more lines of position must be taken to determine position, the resultant position error can be substantial.

SUMMARY OF THE INVENTION

In view of the problems associated with the tilt error in a sextant and the difficulty of vertically positioning a sextant with the dipping procedure, it is an object of the invention to provide an optical device which facilitates the vertical positioning of a sextant to minimize the tilt error.

It is a further object to provide a device for vertically positioning a sextant which is economical and easy to use. An object is to provide a device which facilitates the positioning of the image of a celestial body upon a direct view of the horizon and makes it difficult, if not impossible, to place a false image of the celestial body on a false horizon line.

Another object is to provide an optical device for vertically positioning the sextant which can be rotated out of the line of sight when a celestial body is initially being located.

A further object is to provide an optical device for vertically positioning the sextant which includes mechanical adjustment elements for periodically calibrating the device.

Additional objects and advantages of the invention will be set forth in part in the description which follows, and in part will be obvious from the description, or may be learned by practice of the invention. The objects and advantages of the invention will be realized and obtained by means of the instruments and combinations particularly pointed out in the appended claims.

To achieve the objects and in accordance with the purpose of the invention, as embodied and broadly described herein, the invention comprises a device for vertically positioning a sextant to minimize tilt error in the measurement of a celestial body's altitude relative to the horizon comprising optical means fixed to the sextant and positioned along the line of sight and between the sextant's horizon mirror and eyepiece for producing in one portion of the sextant's viewing area a secondary horizon which will align with the direct horizon only when the sextant is vertical and means for adjusting the position of the optical means relative to the sextant to thereby calibrate the device.

It is to be understood that both the foregoing general description and the following detailed description are exemplary and explanatory only and are not restrictive of the invention, as claimed.

The accompanying drawings, which are incorporated in and constitute a part of the specification, illustrate a preferred embodiment of the invention and together with the description serve to explain the principles of the invention.

BRIEF DESCRIPTION OF THE DRAWINGS

FIG. 1 is a perspective view showing a sextant which includes the preferred embodiment of the invention.

FIG. 2 is an illustration representing the standard dipping procedure used to vertically align a sextant which does not include an embodiment in the invention.

FIG. 3 is an exploded view of the preferred embodiment of the invention, detached from a sextant.

DETAILED DESCRIPTION OF THE INVENTION

Figure 4:
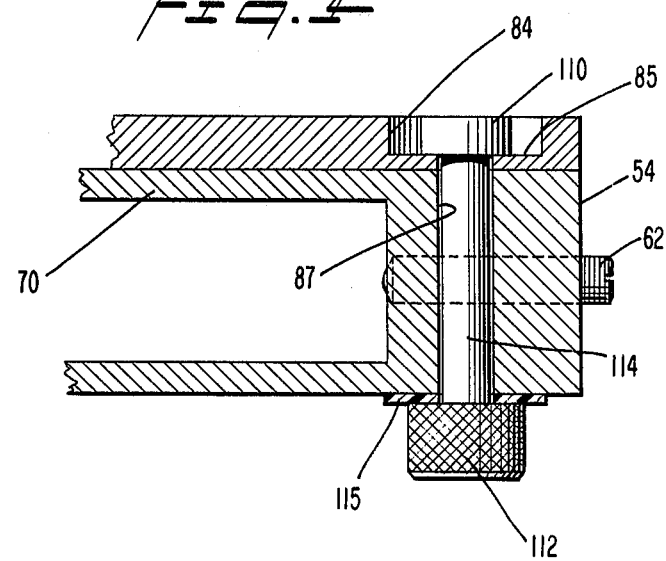
FIG. 4 is a cross section view showing the calibration mechanism of the preferred embodiment of the invention.

Reference will now be made in detail to the present preferred embodiment of the invention, an example of which is illustrated in the accompanying drawing.

Referring first to FIG. 1, the invention consists of a device, shown generally by the number 50, which can be fixed to the body of a sextant 8. In the present preferred embodiment of the invention, the device includes a bracket, designated generally 52, which is fixed to the frame 30 of the horizon mirror 20. The bracket 52 includes a first bracket member 54 fixed directly to the horizon mirror frame 30 and a second bracket member 56 connected to the first bracket member 54. A frame 58 is pivotably connected to the second bracket member 56, and that frame 58 in turn holds a relatively flat, acute-angle prism 60. The frame 56 and relatively flat, acute-angle prism 60 can be pivoted to at least two positions. In one position, shown in FIG. 1, the frame 56 and prism 60 are out of the sextant's line of sight. In the second position, shown in FIG. 3, the frame and prism are positioned between the sextant's horizon mirror 20 and the eyepiece 18 and are in the sextant's line of sight.

A more detailed illustration of the preferred embodiment of the present invention is shown in FIGS. 3 and 4. The first bracket 54 includes a recess 70 sized to slidably fit over the frame 30 of the sextant's horizon mirror 20. When first bracket 54 is fit over the horizon mirror frame 30, setscrews 62 and 64, threaded in the first bracket member 54, can be rotated to securedly fix the first bracket member 54 to the sextant. Once secured, the first bracket member is stationary relative to the sextant.

The second bracket member 56 has an elongated body 76 from which two ears 78 and 80 protrude. The second bracket member 56 is pivotably connected to the first bracket member 54 by a pin 55. When the optical device 50 is fixed to a sextant, the second bracket member 56 pivots relative to first bracket member 54 about an axis perpendicular to the plane of the horizon mirror, as shown in FIG. 1. The second bracket member 56 includes at one end a recessed elongated slot 84. As shown in FIG. 4, slot 84 includes a bottom lip 85 and a central hole 87. Slot 84 in combination with certain other elements of the device provides a means for promoting the pivoting of the second bracket member 56 relative to the first bracket member 54 to thereby calibrate the device, as described in more detail in a later portion of the specification.

Prism frame 58 is pivotably connected to the second bracket member 56 by pins 90 which protrude through holes in ears 78 and 80 and are fixed, by glue or other known means, to the prism frame 58. As an alternative, the pins 90 can be directly fixed to the flat prism 60, making it unnecessary to include a prism frame in the optical device. In the preferred embodiment of the invention, the pins 90 are snugly received by the holes in the ears to thereby restrain the unintentional pivoting of the frame 58. As shown in FIG. 3, the frame is rotatable to a first position in the sextant's line of sight and to a second position, shown in dotted lines, out of the line of sight. In the preferred embodiment, the frame includes detent holes 100 and 101 which cooperate with a resilient finger 102, fixed to second bracket member 56, to hold the frame in the first and second positions and resist any unintentional pivoting.

An acute-angle prism 60 is fixed to the frame 58. The prism is sized so that the prism covers only one half or less of the horizon mirror when the frame 58 and prism 60 are positioned in the sextant's line of sight. The acute-angle prism 60 is of a standard type which will diverge light rays a predetermined angle in a plane perpendicular to its optical axis, as is well-known in the art. The optical axis of the prism is shown generally by a dotted line 108 and is defined by the intersecting planes of the faces of the prism. As described in more detail below, when the device is positioned on the sextant it is desired that the optical axis 108 of the prism 60 be parallel to the plane of the sextant's body.

When (1) the optical device 50 of the present invention is fixed to a sextant, (2) the frame and prism are pivoted in the line of sight, and (3) the optical axis of the flat prism is parallel to the plane of the sextant's body, the prism will produce in the sextant's viewing area a secondary horizon which will align with the direct horizon only when the sextant is vertical. However, the present invention will properly position a sextant only if the optical axis of the prism is parallel to the plane of the sextant's body. The physical jarring and wear of a sextant, as well as temperature changes, can misalign the optical axis of the prism 60. Therefore, the optical device 50 includes a means for adjusting the position of the prism 60 relative to the sextant 8.

In the present preferred embodiment of the invention, the calibration means is provided by a recessed elongated slot 84, eccentric cam 110, and adjusting member 112 which includes a knurled knob and an integral elongated shaft and is fixed at its one end to cam 110. The eccentric cam 110 is sized to ride within the elongated slot 84 with its bottom surface resting upon the bottom lip 85 of the slot and its sides cooperating with the side walls of the slot 84. Adjusting member 112 is journalled in a cylindrical sleeve 114 formed in first bracket member 54, protrudes through the central hole 87 in the bottom lip 85 of recessed slot 84, and is fixed to the cam 110.

Preferably, the optical device includes a means to ensure that the adjusting member 112 will resist any unintentional rotation. The shaft of adjusting member 112 can be tightly fitted within the sleeve 114 of the first bracket member, or a resilient washer 115 can be positioned between the head of the thumbscrew and the first bracket member 54. Other similar known means of impeding undesired motion can be utilized.

The rotation of adjusting member 112 and eccentric cam 110 promotes the pivoting of the second bracket member 56 relative to the first bracket member 54. The pivoting of second bracket member 56, frame 58, and prism 60 relative to first bracket member 54, and thus sextant 8, permits the adjustment of the optical axis 108 of the prism relative to the plane of the sextant's body. In the present preferred embodiment, the above disclosed calibration can produce approximately 3° for pivoting. That range of pivoting has been found to be sufficient for the presently preferred embodiment, it being understood that other embodiments may require a different range of adjustment.

In view of the importance of properly aligning the optical axis of the prism 60 with sextant 8, the inventor has devised a reference device to determine visually when the optical axis of the prism is parallel to the plane of the sextant's body. The device, referred to generally as device 140, includes a first rectangular planar face 142 and a second planar face 144 perpendicular to the first face 142. As shown in FIG. 4, the first planar face 142 includes a vertical calibration line 146 perpendicular to planar face 144 and two horizontal reference lines 148 and 149. Horizontal reference lines 148 and 149 are positioned from the plane of the sextant a distance which is equal to the distance from the edge 147 of prism 60 to the plane of the sextant. The device also includes an inclined face 150 which cooperates with the bottom of the telescope 32 of the sextant to thereby snugly place the face 144 of the device 140 against the sextant's body. The contour of the inclined face 150 can be cylindrical to conform to the shape of a telescope or can be fashioned in a V-shape so that it is more universally adaptable to various sized telescopes and eyepieces. The face of the preferred embodiment is V-shaped. When the device 140 is fit with planar face 144 snugly against the sextant, it is assured that the calibration line 146 is perpendicular to the plane of the sextant's body. In use, the reference device 140 is placed in the position between the horizon mirror and the sextant's eyepiece, as shown in FIG. 1 by the dotted line representation of the device 140.

When calibrating the optical device (50) of the present invention, the navigator would look from the rear of the horizon mirror toward the sextant's eyepiece with the prism and the frame in the line of sight and the reference device 140 in position. The navigator will therefore be looking through the prism when observing the top portion of calibration line 146 close to the plane of the sextant and will be directly viewing the bottom portion of the line. The navigator should first align the edge 147 of prism 60 with the reference lines 148 and 149 to ensure that he is looking in a line of sight roughly parallel to the plane of the sextant. Then, if the optical axis of the prism is parallel to the plane of the sextant's body, the calibration line 146 will appear to be one continuous line. On the other hand, if the optical axis is not parallel to the plane of the sextant's body, the calibration line 146 will appear as two non-continuous or stepped lines, rather than the actual single straight line. Therefore, by adjusting the adjusting member 112, the optical axis of the device can be adjusted until the calibration line appears to be straight and continuous and the device is therefore properly calibrated.

When the device is properly calibrated and the frame and prism are positioned between the sextant's horizon mirror and eyepiece and in the line of sight, the prism will produce in the left portion of the sextant's viewing area a secondary horizon which will align with the direct horizon only when the sextant is vertical. A person looking through the eyepiece will see in the right-hand area of the viewing area of the direct horizon and in the left-hand viewing area will see a second horizon which consists of light rays diverted by the prism. The second horizon viewed in the left-hand position of the viewing area, therefore, provides the navigator with a view of a segment of the horizon to the left or right of the direct horizon, depending upon the position of the prism 60. In the preferred embodiment the prism is positioned so that the viewed secondary horizon consists of light rays of the horizon to the left of the direct horizon, the light rays being refracted by the angle of refraction of the prism 60. A prism which diverges light rays by an angle in the range of 2° to 12° will provide a working device. In the preferred embodiment of the invention the prism 60 diverts light rays by 6°, a value determined to be close to optimum by tests of working models of the invention. Angles of diversion which are too large lead to an overly sensitive device which so exaggerates normal tremor of the user's hands so that it is difficult or impossible for the user to decide when the sextant is vertical. On the other hand, angles which are too small reduce the sensitivity and effectiveness of the instrument to the point that out-of-vertical errors cannot easily be detected.

Figure 5:
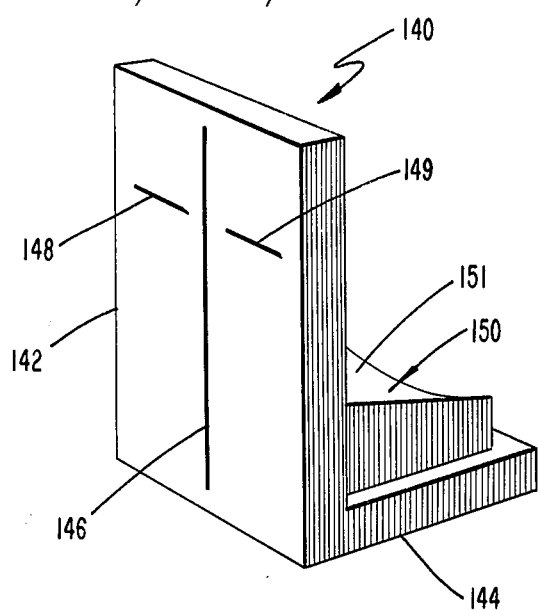
FIG. 5 is a perspective view illustrating a device to visually calibrate the preferred embodiment of the invention.
Figure 6:
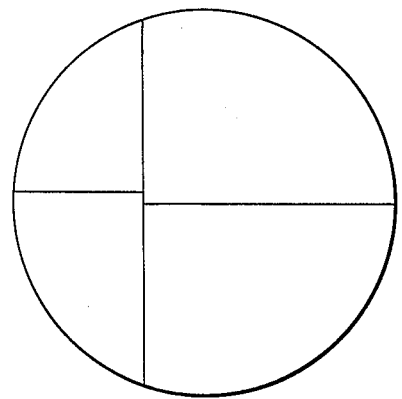
FIG. 6 is a representation of stepped horizon lines viewed through the eyepiece of the sextant which includes the invention, when the sextant is not vertically positioned.
Figure 7:
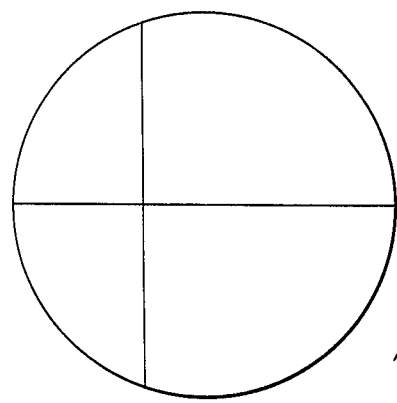
FIG. 7 is a representation of the aligned horizon lines viewed through the eyepiece of a sextant which includes the invention, when the sextant is vertically positioned.

Unless the optical axis of the prism is perpendicular to the true horizon and therefore vertical, the second view of the horizon will be stepped relative to the direct horizon as illustrated generally in FIG. 6. In the preferred embodiment the secondary horizon is actually a view of the horizon displaced 6° in a plane perpendicular to the optical axis of the prism. When the optical axis of the prism is perpendicular to the true horizon (vertical), the light rays of the viewed secondary horizon will be diverged in a plane coincident with the horizon and the direct and secondary horizon will be colinear. In contrast, when the optical axis of the prism is not vertical, the light rays of the viewed secondary horizon will be diverged along a plane which is inclined to the actual horizon and the viewed secondary horizon will be stepped relative to the direct horizon. Thus, by rotating the sextant until the second and direct horizons are colinear, as illustrated in FIG. 5, the observer can properly vertically position the sextant.

The prism 60 is preferably, but not necessarily, placed in front of the horizon mirror. So positioned, the prism is in the optical paths between the index mirror and the horizon mirror, and the horizon mirror and the eyepiece. Thus, any portion of the star image which falls within the prism 60 and therefore is over the false secondary horizon, rather than the direct horizon, will pass through the prism twice and will be diverted toward the left by twice the refraction angle of the prism. In the preferred embodiment, the secondary image of the celestial body will be diverted to the left by about 12° thereby making it difficult, if not impossible, for a sextant user to place the false image of the celestial body on the false horizon. Thus, the positioning of the prism at this preferred site increases the device's reliability and eases its actual use.

The prism 60 and frame 10 can also be positioned to the rear of the horizon mirror. So positioned, it will provide a secondary horizon in the viewing area but will not diverge the secondary image of the celestial body to the left.

The present invention can be used with sextants having either half-silvered mirrors (one half of which is silvered and one half clear) or a full-view mirror which transits, say, one half of the light and reflects one half. When used with either type of mirror, it is preferred that the prism cover less than one half of the horizon mirror since such a device allows the viewing area to predominantly include the direct image of the celestial body and a direct view of the horizon. When used with a half-silvered mirror, it is essential that the prism not cover all of the clear portion of the horizon mirror, so that a direct image of the horizon can be viewed.

The device can be made as an accessory to sextants or can be incorporated as a permanent fixture. In addition, it is believed that the invention can, if desired, be placed at other positions along the line of sight of the eyepiece. For example, an acute-angle prism could be positioned at the objective lens of a sextant's telescope. Furthermore, sextants often include a non-Galilean refracting telescope which has one or more image planes between the objective lens and the eyepiece. In such telescopes, an acute-angle prism could be positioned at an image plane between the objective lens and the erecting lens, or eyepiece. When positioned on or in a telescope, the device can be calibrated by rotating the telescope and prism about the telescope's axis until the optical axis of the prism is parallel to the place of the sextant's body. In the alternative, mechanical adjustment means can be provided to permit the rotation of the prism relative to the telescope. Other optical means, such as flat prisms back-to-back, a "dove" prism, mirrors, and lens, or combinations thereof, may serve the same function as the acute-angle prism.

The invention greatly facilitates the vertical positioning of a sextant. In use, a navigator would first properly calibrate the perpendicularity and the parallelism of the sextant's index mirror, and the horizon mirror. He would then calibrate the optical device of the present invention to ensure that the optical axis of the prism is parallel to the plane of the sextant's body. Next, he would rotate the optical device out of the line of sight so that he could locate the desired celestial body without interference. Finally, when taking the final sight, the optical device would be rotated into the line of sight. By rotating the micrometer drum to bring the celestial body onto the direct horizon and rotating the sextant until both the direct horizon and the indirect horizon are aligned, a precise reading of the celestial body's altitude can be taken. The invention, therefore, completely obviates the need to go through the complicated and less precise step of rocking the sextant to attempt to position it vertically.

In a recent test the inventor took a series of sights from a 30 foot boat in 6 foot seas—a condition of quite violent motion and one from which sights would normally be next to impossible. He was able to take rapid and accurate sights, with an average error very nearly equal to the best that can be done under very stable conditions by an expert navigator.

Other embodiments of the invention will be apparent to one skilled in the art from consideration of the specification and practice of the invention disclosed herein. It is intended that the specification and examples be considered as exemplary only, with a true scope and spirit of the invention being indicated by the following claims.

What is claimed is:

1. A device for vertically positioning a sextant to minimize tilt error in the measurement of a celestial body's altitude relative to the horizon comprising:
   optical means fixed to the sextant and positioned in the line of sight of the sextant's horizon mirror and eyepiece, for producing in a portion of the sextant's viewing area a secondary horizon which will align with the direct horizon only when the sextant is vertical,
   said optical means including a prism which will divert light rays a predetermined angle in a plane perpendicular to its optical axis,
   said prism being positioned between the index mirror of the sextant and the horizon mirror of the sextant and between the horizon mirror and eyepiece so that any portion of a celestial body image that is reflected from the index mirror and falls within the prism will pass through and be diverted twice by the prism to ensure that the user of the sextant will not place a celestial body image on a false horizon line diverted through the prism, and
   means for adjusting the position of the optical means relative to the sextant to thereby calibrate the device.

2. The device of claim 1 further comprising means for permitting the displacement of the optical means out of the line of sight when a celestial body is being initially located.

3. The device of claim 2 wherein said means for permitting displacement includes a bracket fixed to the sextant's body and a frame pivotably connected to said bracket for holding said prism, said frame being pivotable to a first position in the sextant's line of sight and a second position out of the line of sight.

4. The device of claim 3 wherein said bracket includes a first stationary bracket member fixed to the sextant and a second bracket member pivotably connected to said first bracket about a first axis perpendicular to the plane of the horizon mirror.

5. The device of claim 4 wherein said adjusting means includes a camming means which upon rotation pivots said second member about said first axis to thereby align the optical axis of the prism parallel with the plane of the sextant's body.

6. The device of claim 5 further comprising means to restrain the unintended rotation of said camming means and the unintended pivoting of said frame.

7. A device for vertically positioning a sextant to minimize tilt error in the measurement of a celestial body's altitude relative to the horizon comprising:
   a bracket including a first bracket member fixed to the horizon mirror frame of the sextant and a second bracket member pivotably connected to said first member about a first axis perpendicular to the plane of the horizon mirror of the sextant,
   a frame pivotably connected to said second bracket member about a second axis perpendicular to the first axis and pivotable to a first position where the frame is in the sextant's line of sight and between the sextant's index mirror and horizon mirror and also between the sextant's horizon mirror and eyepiece and a second position where the frame is out of the sextant's line of sight,
   an acute-angle prism which will divert light rays a predetermined angle in a plane perpendicular to its optical axis, said prism being fixed within said frame for producing in a portion of the sextant's viewing area a secondary horizon which, when the frame is pivoted to said first position and the optical axis of said prism is parallel to the plane of the sextant's body, will align with the direct horizon only when the sextant is vertical, and
   camming means for causing the second bracket member, the frame, and the prism to pivot about said first axis relative to said first bracket member to thereby calibrate the prism so that the optical axis of the prism is parallel to the plane of the sextant's body.

8. The device of claim 7 wherein the camming means includes a recessed, elongated slot formed in a portion of the second bracket member, an eccentric cam riding within the recessed slot, and a shaft housed in the first bracket member and fixed to the cam.

9. The device of claim 1 further comprising means for holding said frame in said first and second positions and resisting unintentional pivoting of said frame.

10. The device of claim 7 further comprising a visual reference device for visually determining when the optical axis of the prism is parallel to the plane of the sextant's body, the visual reference device including:
    a member having a planar surface,
    means for removably fixing the member to the sextant in a manner in which the planar surface of the member is perpendicular to the plane of the sextant and is positioned between the eyepiece of the sextant and the prism,
    a first reference line on the planar surface, the first reference line being perpendicular to the plane of the sextant when the member is fixed to the sextant, and
    a second reference line on the planar surface, said second reference line being perpendicular to said first reference line and being positioned a distance from the plane of the sextant equal to the distance the edge of the prism is from the plane of sextant, when the frame is pivoted to said first position and the member is fixed to the sextant.

11. The device of claim 1 wherein said prism diverts light rays by an angle of between 2° to 12°.

12. The device of claim 8 wherein said prism diverts light rays by an angle of approximately 6°.

13. The device of claim 7 wherein said prism diverts light rays by an angle of between 2° to 12°.

14. The device of claim 7 wherein said prism diverts light rays by an angle of approximately 6°.

* * * * *

UNITED STATES PATENT AND TRADEMARK OFFICE
CERTIFICATE OF CORRECTION

PATENT NO. : 4,428,671
DATED : January 31, 1984
INVENTOR(S) : Thomas D. Davies

It is certified that error appears in the above—identified patent and that said Letters Patent is hereby corrected as shown below:

Claim 9, line 1 "device of claim 1" should be

--device of claim 7--.

Signed and Sealed this

Twenty-second Day of May 1984

[SEAL]

Attest:

GERALD J. MOSSINGHOFF

Attesting Officer

Commissioner of Patents and Trademarks